Sept. 13, 1966  T. BUDZICH  3,272,278
RESPONSE CONTROLS FOR FLUID DRIVES
Filed June 8, 1964
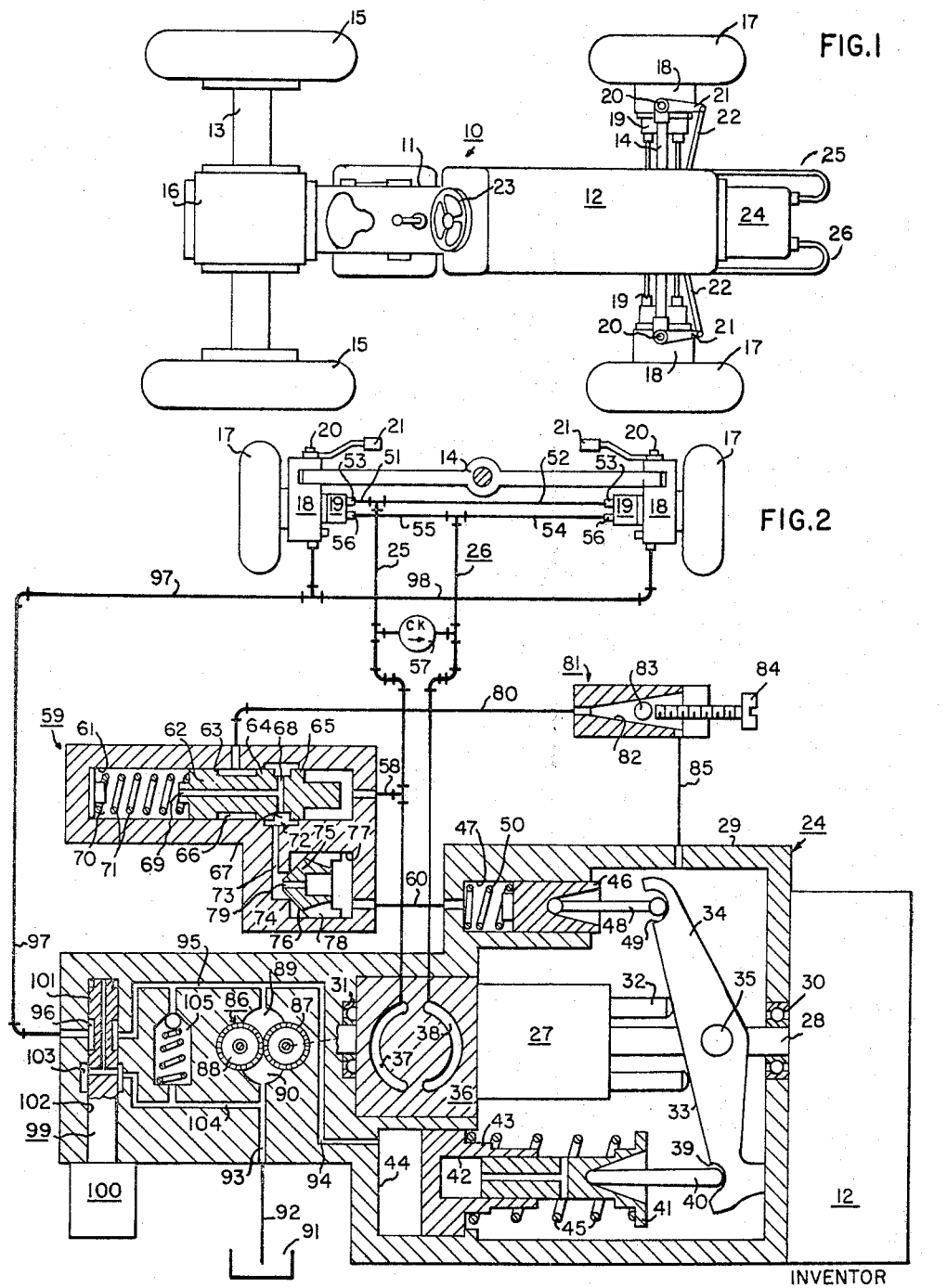
INVENTOR
TADEUSZ BUDZICH
BY William N. Hogg
ATTORNEY United States Patent Office 3,272,278
Patented Sept. 13, 1966

3,272,278
RESPONSE CONTROLS FOR FLUID DRIVES
Tadeusz Budzich, 3344 Colwyn Road, Cleveland, Ohio
Filed June 8, 1964, Ser. No. 373,188
8 Claims. (Cl. 180—44)

This invention relates generally to fluid power drives for self-propelled vehicles, such as farm tractors, earth movers, and the like. In more particular aspects, this invention relates to front-axle fluid-power drives which are synchronized with the rear driving wheels of the vehicle by a variable-flow pump equipped with an automatic pressure-responsive controller.

A front-axle fluid-power drive using fluid motors and a variable displacement pump controlled by an automatic pressure responsive controller, which varies the pump displacement to maintain a constant system pressure, will in a well-known manner develop a constant torque at the fluid motors. The fluid motors of such a drive, which are mounted on steering wheels and drivingly engaged therewith, will automatically synchronize their driving effort with the mechanical transmission supplying power to the rear driving wheels.

The synchronization of such a drive depends, however, upon there being sufficient traction resistance at the front wheels to contain the driving torque developed at the fluid motors. Loss of traction resistance in the front wheels of such a drive will automatically release the full potential energy of the drive within the maximum capacity of the variable-flow pump. The automatic controller of the pump must have high response characteristics to prevent excessive pressure surges within the transmission system; hence, in the event of loss of traction resistance at the front wheels, the front wheels will skid and with the resulting high rate of acceleration bring them rapidly to maximum speed. Once the maximum speed, coinciding with the maximum displacement of the pump is reached the system pressure will fall, thereby bringing the drive within the limits of available traction resistance. The loss of traction resistance is usually a transient condition and with a high response control system may produce instability and roughness of the fluid drive, thereby destroying the inherent synchronization characteristics of the drive.

It is therefore a principal object of this invention to provide an automatic synchronizing control for an auxiliary fluid drive, which upon a momentary loss of traction will maintain stability of the drive.

Another object of this invention is to provide an automatic synchronizing control for an auxiliary fluid drive, which upon momentary loss of traction resistance will permit acceleration of the front wheels only at a controlled slow rate.

Still another object of this invention is to provide an automatic synchronizing control for a fluid front-wheel tractor drive, which has high response characteristics in the direction of decrease of the vehicle speed and slow response characteristics in the direction of increase of the vehicle speed.

Further objects and advantages of the invention will become apparent from a consideration of the following description and drawings in which:

FIGURE 1 is a diagrammatic plan view of a tractor showing the mounting of fluid motors and a representative mounting of a fluid pump; and FIGURE 2 is a somewhat schematic representation of fluid drive components of this invention with diagrammatically shown variable-displacement pump and pump-control components.

Although the invention has broader application, it will be described hereinafter in specific relation to a tractor which presently constitutes the preferred use.

Referring now to the drawing and for the present to FIGURE 1 thereof, a tractor, generally designated as 10, comprises a frame 11 mounting an engine 12, back axle 13 and front axle 14. Rear wheels 15 are mounted on back axle 13 and are drivingly connected with engine 12 by a mechanical transmission 16. Steering front wheels 17 are provided and are equipped with mechanical gear reducers 18 mounting fluid motors 19. The combination of the front steering wheels 17, gear reducers 18 and fluid motors 19 are pivotally mounted by king pins 20 in respect to front axle 14. Conventional steering arms 21 through tie rods 22 connect the front steering wheels 17 to tractor steering wheel 23. A variable flow pump, generally designated as 24, is driven by the engine 12 and is connected through flexible ducts 25 and 26 to the fluid motors 19. As shown in FIGURE 1, the variable flow pump 24 is directly mounted on the engine, although it can be mounted at any suitable power take-off position.

Referring now to FIGURE 2, the variable flow pump 24 is shown with its working components and controls diagrammatically disposed. The rotary motion from engine 12 is transmitted to cylinder barrel 27 by shaft 28, which is journalled in pump housing 29 by bearings 30 and 31. The cylinder barrel 27 is conventionally equipped with cylinder bores (not shown) reciprocably guiding pistons 32, which pistons abut reaction surface 33 of trunion 34. The trunnion 34 is mounted for limited rotation in respect to pump housing 29 by trunnion pin 35. The cylinder barrel 27 abuts valve plate 36 (diagrammatically shown rotated 90° for clarity of explanation), which valve plate has a high-pressure timing port 37 and a low-pressure timing port 38. The trunnion 34 has an indented part-spherical surface 39 engaging a first push rod 40, which push rod engages a spring guide 41. The spring guide 41 is slidably disposed in bore 42 of unloading piston 43. The unloading piston 43 is slidably guided in unloading bore 44. A control spring 45 is interposed between spring guide 41 and unloading piston 43 and through push rod 40 biases trunnion 34 toward the position of its maximum angular inclination and thus maximum pump output, which is the position shown in FIGURE 2. A control piston 46 is guided in a control bore 47 provided in the pump housing 29 and engages, through a second push rod 48, a second indented part-spherical surface 49 of pump trunnion 34. The control bore 47 contains a reaction spring 50 which biases the control piston 46 and push rod 48 toward engagement with trunnion 34.

The high-pressure timing port 37 is connected through flexible duct 25, and ducts 51 and 52 with high-pressure ports 53 of fluid motors 19. The low-pressure timing port 38 is conected through flexible duct 26, and ducts 54 and 55 with low-pressure ports 56 of fluid motors 19. A conventional check valve 57 functionally connects, in one direction, flexible duct 26 to duct 25, while preventing flow from flexible duct 25 to duct 26. The flexible duct 25 also conducts pressure fluid from high-pressure timing port 37 through passage 58 to an automatic pressure-responsive pump controller, generally designated as 59. The controller 59 is connected through passage 60 with control bore 47. The pressure-responsive pump controller 59 contains bore 61, slidably guiding a control spool 62. Control spool 62 of the controller 59 is equipped with lands 63, 64 and 65 defining therebetween annular spaces 66 and 67. Annular space 67 is connected through passages 68 and 69 with space 70 within bore 61. Valve spring 71 is interposed between control spool 62 and one end of bore 61. The bore 61 is interrupted by annular ring 72 constituting a relieved portion thereof, which through passage 73 communicates with seat 74 of a flow-restricting poppet 75. The flow-restricting poppet 75 is equipped with a conical surface 76 disposed to selectively engage seat 74. The flow-restricting poppet 75 is slidably guided in a bore 77 and has grooves 78, and an orifice 79 connecting passage 73 with bore 77 and passage 60, and therefore control bore 47. The annular space 66 is connected through passage 80 with an adjustable flow restrictor, generally designated as 81, having a conical metering bore 82, ball 83 and adjusting screw 84 for positioning the ball 83 longitudinally in respect to the conical metering bore 82. The adjustable flow restrictor 81 is connected through passage 85 with low pressure zone, contained within pump housing 29.

A fixed-displacement gear pump, generally designated as 86 is provided having a driving gear 87 and a driven gear 88. The driving gear 87 is drivingly connected to shaft 28. The gear pump 86 is further provided with an outlet port 89 and an inlet port 90. The inlet port 90 is connected to diagrammatically shown reservoir 91 by line 92 and passage 93. The outlet port 89 communicates through passage 94 to unloading bore 44 and through passage 95, annular space 96, and line 97 with hydraulically operated clutches (not shown), contained within gear reducers 18. The hydraulic clutches are adapted for selective engagement and disengagement in response to the fluid pressure applied thereto via line 97. Since the clutches in no way constitute a part of the present invention, further description is not warranted; however, for a description of the structure and function thereof, reference may be had to application Serial No. 373,426 filed June 8, 1964, entitled, Fluid Pressure Operated Drive and Clutch Systems. An unloading valve spool 99, operated by solenoid 100, is equipped with land 101, defining annular space 96. Unloading spool 99 is slidably guided in bore 102, equipped with annular ring 103, which communicates with reservoir 91 through passages 104 and 93, and line 92. A conventional relief valve 105 functionally interconnects passages 95 and 104 and therefore high-and-low pressure ports 89 and 90 of gear pump 86 and sets the pressure level developed at the high pressure port 89.

With respect to the operation of the apparatus hereinabove described, rotary motion from the engine 12 is transmitted by the shaft 28 to the cylinder barrel 27 thereby causing pistons 32 to reciprocate as they follow the inclined reaction surface 33 of trunnion 34. This reciprocating motion will induce a pumping action within the cylinder barrel 27, which in a well-known manner is phased by the high-pressure timing port 37 and low-pressure timing port 38 of the valve plate 36. The magnitude of the pressure flow generated within the cylinder barrel 27 is proportional to the angle of inclination of the reaction surface 33 of trunnion 34 in respect to the axis of rotation of shaft 28, as is well known in the art. With the reaction surface 33 perpendicular to the axis of rotation of the shaft 28, the pump flow becomes zero; with the maximum angle of inclination, as shown in FIGURE 2, the pump volume output becomes maximum. Control of fluid flow is therefore accomplished by changing the angle of inclination of the trunnion 34, the angle being regulated by the action of the control spring 45, control piston 46, and automatic pressure responsive pump control 59. The control spring 45, acting through spring guide 41 and push rod 40, biases trunnion 34 toward the maximum pump-flow position. A pressure signal, supplied from automatic pressure-responsive controller 59 and transmitted through passage 60 to control bore 47, will react on the cross-sectional area of control piston 46, applying force thereto. This force, transmitted to trunnion 34 by push rod 48 will tend to overcome the bias of the control spring 45, which is maintained in a preloaded position by unloading piston 43, and rotate the trunnion 34 around trunnion pin 35 toward the position of zero pump displacement. The automatic pressure-responsive control 59 is arranged to supply a modulated control signal which will vary the angle of inclination of trunnion 34 and therfore volume output of the pump to maintain a relatively constant high pressure in the high-pressure timing port 37. The modulation of the automatic pressure-responsive control 59 is accomplished in the following manner. Relatively high fluid pressure, conducted from the high-pressure timing port 37, through high-pressure flexible duct 25 and passage 58, reacts on the cross-section area of control spool 62, urging it from right to left against the biasing force of the valve spring 71. At a selected pressure level, as dictated by the preload of the valve spring 71, the control spool 62 will move from right to left, connecting annular space 67 with the high-pressure fluid. The rising pressure in the annular space 67, transmitted through passages 68 and 69 to space 70, will react on the cross-sectional area of the control spool 62, supplementing the biasing force of valve spring 71 and moving the control spool 62 from left to right, thereby effectively isolating annular space 67 from the high pressure fluid. In this manner, under the influence of the above forces, the control spool 62 will continuously seek a condition of floating equilibrium, maintaining a pressure level in the annular ring 72 and space 70 proportional to the fluid pressure in timing port 37 above a preselected pressure level, as dictated by the preload of the valve spring 71. A drop in the fluid pressure below the level equivalent to the preload in the valve spring 71 will connect annular ring 72 with annular ring 66, and through passage 80, and adjustable flow restrictor 81 to the low-pressure zone contained within the pump housing 29. A change in the pressure in the annular ring 72, modulated by the automatic pressure-responsive pump control 59, will be transmitted to passage 73, seat 74 and grooves 78 of the flow-restricting poppet 75, and thence to passage 60 and control bore 47. This modulated pressure signal, reacting on the cross-section area of the control piston 46, working in conjunction with biasing force of control spring 45, will regulate the angular inclination of trunnion 34 and therefore the volume flow of the pump to maintain a relatively constant fluid pressure in the high pressure timing port 37.

The flow-restricting poppet 75, under acting pressure differential is free to slide relative to bore 77. Flow of fluid from annular ring 72 to control bore 47 will unseat conical surface 76 from seat 74, permitting relatively free flow of fluid past the large area grooves 78 of the flow restricting poppet 75. A flow of fluid from control bore 47 to annular space 67 will cause the engagement of the conical surface 76 with seat 74, forcing the fluid to flow through the restricted metering orifice 79. In this manner, the flow of fluid at the modulated control pressure from the automatic pressure-responsive pump control 59 to control bore 47, signifying reduction in the angularity of trunnion 34 and therefore reduction in the pump flow, will be passed by flow-restricting poppet 75 at relatively low resistance, the fluid lifting the poppet 75 from its seat 74 to provide relatively rapid flow. Flow from the control bore 47 past the flow restricting poppet 75 must be diverted through annular space 66 and passage 80 to the conical metering bore 82 of adjustable flow restrictor 81, where the fluid is forced to flow past ball 83 thereof before entering passage 85 which transmits the fluid to a zone of low-pressure within the pump housing. The adjustment of adjusting screw 84 will position ball 83 in respect to conical metering bore 82 of the adjustable flow restrictor 81, thus permitting adjustment in the resistance to flow of fluid from control bore 47 to the low pressure zone contained within pump housing 29.

With the operation above described, a control signal and control fluid flow from the automatic pressure-responsive pump control 59 to the control bore 47, signifying the reduction in the pump flow, is passed at relatively low flow resistance, thus providing a high response, fast acting control in the direction of reduction of the pump flow. Conversely a control signal and control fluid flow from control bore 47 through the automatic pressure-responsive pump controller 59, signifying an increase in the pump flow, is passed at relatively high flow resistance, thus providing a slow acting control in the direction of increase of the pump flow.

The operation of the automatic pressure-responsive pump control 59 can only be maintained as long as control spring 45 continues to bias trunnion 34 toward the position equivalent to maximum pump flow. This requires that pressure fluid be maintained in unloading bore 44 to support the preload in the control spring 45. A loss of pressure in unloading bore 44 and a consequent loss of preload in control spring 45 will automatically bring trunnion 34, under the action of reaction spring 50, to the position equivalent to zero pump flow, thereby unloading the fluid drive.

The gear pump 86 will maintain pressure in the unloading bore 44, equivalent to the setting of the relief valve 105, unloading valve spool 99 effectively isolating passages 95 and 104; however, movement of the unloading valve spool 99 downward, as viewed in FIGURE 2, under the action of solenoid 100 will effectively short circuit passages 95 and 104, thus connecting outlet port 89 with inlet port 90. The pressure in the unloading bore 44 will then drop to a sufficiently low value to unload the variable flow pump.

The advantages of the apparatus functioning as hereinabove described will be readily appreciated from a consideration of the following explanation relating to the typical operation of the fluid power drive. As is conventional, during operation of the drive, the high-pressure fluid from the high-pressure timing port 37 is transmitted through high-pressure flexible duct 25, ducts 51 and 52, and high-pressure ports 53 to the fluid motors 19. The flow of high-pressure fluid will generate in a well-known manner rotary motion in the fluid motors 19. This rotary motion is transmitted through gear reducers 18 to wheels 17. The high-pressure fluid, after performing work in driving wheels 17, is exhausted from low-pressure ports 56 and through ducts 55 and 54, and low-pressure flexible duct 26 returns to low-pressure timing port 38. With this arrangement, the speed of rotation of the front wheels 17 is dictated by the surface speed of the tractor, which is driven by the rear wheels 15 connected through mechanical transmission 16 to the engine 12. The driving torque developed by the fluid motors and transmitted to the steering wheels is directly proportional to the system pressure and therefore dictated by the preload in the valve spring 71. This torque helps to propel the tractor. The speed of rotation of the steering wheels, when the traction resistance encountered at the steering wheels is higher than the torque supplied by the fluid motors, is dictated by the speed of rotation of the rear wheels 15. Under these conditions both the rear wheels 15 and steering wheels 17 are therefore functionally synchronized by the ground surface. Hence, as long as the traction resistance wholly contains the torque developed at the steering wheels by the fluid motors, the higher the surface speed of the tractor, the higher will be the speed of rotation of the steering wheels 17 and the larger will be the flow of high pressure fluid required by the fluid motors 19. Therefore, during tractor operation, the maximum torque contribution of the fluid drive is strictly limited by the traction conditions existing at the steering wheels. Under various operating conditions, the traction coefficient of any specific ground surface may vary widely. Consequently, to maintain system synchronization under all such traction conditions, the torque contribution of the steering wheels would have to be selected at a low level, which would thru impair the effectiveness of the fluid drive. At highei pressure settings, required for synchronization under normal traction coefficient, a sudden decrease in the traction coefficient below the traction resistance, will bring the fluid drive out of synchronization. With this condition, a loss of traction will result in severe skidding of the steering wheels over the ground surface. Especially with a fast-acting high-response automatic pump control of the type as described above, momentary loss of traction and a resulting skid would cause very rapid acceleration of the skidding wheels up to the point where the maximum flow capacity of the pump is reached. This condition would be further aggravated by further reduction of the traction coefficient caused by dynamic skidding. Under a condition of varying traction coefficient and high torque developed at the steering wheels, in a system employing automatic fast-response pump control, rapid accelerations and decelerations of the front wheels will result. This produces a hopping action when the tractor accelerates and decelerates while going across a field. By slowing down the response of the automatic control of the variable flow pump, this hopping action can be reduced or eliminated, especially if the response of the control is decreased to a very low level. However, this very slow acting control will provide extreme high pressure surges within the fluid drive, thereby contributing to early failure of the drive components. For example, when rapidly stopping the tractor, the resulting pressure surge of a slow acting control may damage the system components. Therefore, the automatic pump control must be as fast as possible in its response in the direction of reduction of the pump flow. With the apparatus of FIGURE 2, as described hereinabove, the automatic pressure-responsive pump control 59 is provided with a very fast response in the direction of reduction of the pump flow while the pump response in the direction of increase in the pump flow is greatly reduced by flow restricting poppet 75 and adjustable flow restrictor 81. In this manner, excessive pressure surges are completely eliminated from the system, since the control may instantaneously respond to bring the pump flow to zero. At the same time, the hopping action of the tractor is eliminated by making the drive less sensitive to variations in traction coefficient and especially preventing the rapid loss of traction coefficient under rapid dynamic skidding.

Although a preferred embodiment of the invention has been shown and described herein, it will be obvious to those skilled in the art that other adaptations and modifications may be made without departing from the scope and spirit of the appended claims.

What is claimed is:

1. In a self-propelled vehicle having a frame with driving wheels connected thereto, an engine, a mechanical transmission interposed between said engine and said driving wheels and at least one steering wheel pivotally mounted in respect to said frame; the combination therewith of a fluid power transmission and control comprising, a fluid motor drivingly connected to each of said steering wheels, a variable flow pump for driving each of said fluid motors, said variable flow pump having a flow changing mechanism, means urging said flow changing mechanism toward a position of maximum pump flow, signal responsive actuating means opposing said last named means and urging said flow changing mechanism toward a position of minimum pump flow, a source of control pressure, a low pressure zone, means for selectively connecting said signal responsive actuating means with said source of control pressure and said low pressure zone to maintain a relatively constant pressure fluid supply from said variable flow pump to said fluid motor, and unidirectional fluid flow-restricting means interposed between said signal responsive actuating means and said low pressure zone for restricting fluid flow from said signal responsive actuating means to said low pressure zone, whereby said flow changing mechanism will be slow acting in the direction of increased pump flow.

2. The combination of claim 1 further characterized by said unidirectional fluid-flow restricting means having flow resistance adjusting means for varying the resistance to fluid flow from said signal responsive actuating means to said low pressure zone.

3. The combination of claim 1 further characterized by said unidirectional fluid-flow restricting means including a tapered bore connected for transmission of fluid therethrough, adjustable closure means mounted for longitudinal movement within and relative to said bore for varying the opening therethrough, whereby the resistance to fluid transmission through the bore may be varied.

4. The combination of claim 1 further characterized by said unidirectional fluid-flow restricting means having a poppet arranged to permit unobstructed fluid flow to said signal responsive actuating means and a flow restricting orifice arranged to restrict fluid flow from said signal responsive actuating means.

5. The combination of claim 4 further characterized by said flow restricting orifice being disposed within said poppet.

6. In a self-propelled vehicle having a frame with driving wheels connected thereto, an engine, a mechanical transmission interposed between said engine and said driving wheels, steering wheels pivotally mounted in respect to said frame; the combination therewith of a fluid power transmission and control comprising, fluid motors drivingly connected to said steering wheels, a variable flow pump for driving said fluid motors, said variable flow pump having a flow changing mechanism, biasing means urging said flow changing mechanism toward a position of maximum pump flow, signal responsive actuating means opposing said biasing means and urging said flow changing mechanism toward a position of minimum pump flow, a source of control pressure, a low pressure zone, pressure responsive pump control means for selectively connecting said signal responsive actuating means with said source of control pressure and said low pressure zone to maintain a relatively constant pressure fluid supply from said variable flow pump to said fluid motors, first duct means connecting said pump control means with said low pressure zone, second duct means connecting said pump control means with said signal responsive actuating means, first fluid flow restricting means positioned within said first duct means for unidirectionally restricting fluid flow therethrough from said signal responsive actuating means, whereby said flow changing mechanism will be slow acting in the direction of increased pump flow.

7. The combination of claim 6 further characterized by second fluid-flow restricting means positioned within said second duct means for unidirectionally restricting fluid flow therethrough from said signal responsive actuating means.

8. In a self-propelled vehicle having a frame, driving wheels connected thereto, an engine, a mechanical transmission interposed between said engine and said driving wheels, steering wheels pivotally mounted in respect to said frame, the combination therewith of a fluid power transmission and control comprising, fluid motors drivingly connected to said steering wheels, a variable flow pump for driving said fluid motors, said variable flow pump having a flow changing mechanism, spring biasing means urging said flow changing mechanism toward a position of maximum pump flow, fluid responsive actuating means opposing said spring biasing means and urging said flow changing mechanism toward a position of minimum pump flow, a source of control pressure, a low pressure zone, pressure responsive pump control means for selectively connecting said fluid responsive actuating means with said source of control pressure and said low pressure zone to maintain a relatively constant pressure fluid supply from said variable flow pump to said fluid motors, first duct means connecting said pump control means with said low pressure zone, second duct means connecting said pump control means with said fluid responsive actuating means, first unidirectional fluid flow restricting means positioned within said first duct means for unidirectionally restricting fluid flow therethrough from said fluid responsive actuating means, said first fluid flow restricting means having a tapered bore connected for transmission of fluid therethrough, adjustable closure means mounted for longitudinal movement within and relative to said bore for varying the opening therethrough and thereby varying the resistance to fluid transmission through the bore, second unidirectional fluid flow restricting means positioned within said second duct means for unidirectionally restricting fluid flow therethrough from said signal responsive actuating means, said second fluid flow restricting means having a poppet arranged to permit unobstructed fluid flow to said fluid responsive actuating means and a flow restricting orifice within said poppet arranged to restrict fluid flow from said signal responsive actuating means, whereby said flow changing mechanism will be slow acting in the direction of increased pump flow.

References Cited by the Examiner

UNITED STATES PATENTS

| 2,731,569 | 1/1956 | Cardillo et al. | 60—53 |
| 2,913,061 | 11/1959 | Beyerstedt et al. | 180—51 X |
| 2,915,985 | 12/1959 | Budzich. | |
| 3,053,043 | 9/1962 | Knowler | 180—66 X |

FOREIGN PATENTS 791,903   3/1958   Great Britain.

BENJAMIN HERSH, *Primary Examiner.*

M. L. SMITH, *Assistant Examiner.*